US005181120A

United States Patent [19]

Hickey et al.

[11] Patent Number: 5,181,120

[45] Date of Patent: Jan. 19, 1993

[54] SURVEILLANCE CAMERA SYSTEM

[75] Inventors: William L. Hickey, Excelsior; Arie Boers, Plymouth, both of Minn.

[73] Assignee: Bayport Controls, Inc., Minnetonka, Minn.

[21] Appl. No.: 836,952

[22] Filed: Feb. 19, 1992

Related U.S. Application Data

[63] Continuation-in-part of Ser. No. 662,966, Mar. 1, 1991, Pat. No. 5,121,215.

[51] Int. Cl.[5] .............................................. H04N 7/18

[52] U.S. Cl. .................................... 358/229; 358/108; 354/81

[58] Field of Search ............... 358/108, 229, 100, 210; 354/81, 79

[56] References Cited

U.S. PATENT DOCUMENTS

| | | | |
|---|---|---|---|
| 3,732,368 | 5/1973 | Mahlab | 178/7.81 |
| 3,739,703 | 6/1973 | Behles | 95/15 |
| 3,819,856 | 6/1974 | Pearl et al. | 178/7.81 |
| 4,080,629 | 3/1978 | Hammond et al. | 358/229 |
| 4,833,534 | 5/1989 | Paff et al. | 358/108 |
| 4,901,146 | 2/1990 | Struhs et ai. | 358/108 |
| 4,920,367 | 4/1990 | Pagano | 354/81 |
| 4,945,367 | 7/1990 | Blackshear | 354/81 |
| 5,111,288 | 5/1992 | Blackshear | 358/108 |

*Primary Examiner*—Victor R. Kostak
*Attorney, Agent, or Firm*—Hugh D. Jaeger

[57] ABSTRACT

A surveillance camera system including a base plate, a truncated cone, a rotation ring spaced from the base of the truncated cone, a camera mounting assembly which readily mounts within the rotation ring, and a dome which rotates with the camera assembly and is easily engaged into position against spring-biased rollers. The system is a unique and novel combination of electrical and electromechanical components providing for ready access of all components in the event of servicing. The system will accept any suitable surveillance camera, and is readily adaptable with any surveillance camera of the appropriate size. An alternative embodiment illustrates a completely rotatable surveillance camera system which can be suspended from a standard.

2 Claims, 7 Drawing Sheets

SURVEILLANCE CAMERA SYSTEM

CROSS REFERENCES TO CO-PENDING APPLICATIONS

This application is a continuation-in-part of U.S. Ser. No. 662,966, filed Mar. 1, 1991, entitled "Surveillance Camera System", to the same assignee as the present patent application, and is now U.S. Pat. No. 5,121,215, issued Jun. 9, 1992.

BACKGROUND OF THE INVENTION

1. Field of the Invention

The present invention pertains to a surveillance camera system, and more particularly, pertains a surveillance camera for use with closed-circuit television systems, such as for store security, building security, and any other security applications.

2. Description of the Prior Art

The prior art surveillance camera systems have been complex electromechanical structures. The structures have been expensive. The structures have also been difficult to install and difficult to maintain. When servicing was required, it would usually require removal of the entire structure which was not always an easy, time-effective procedure.

The present invention overcomes the disadvantages of the prior art by providing a cost-effective surveillance camera system which is easy to install, easy to maintain and will accept any appropriately sized surveillance camera and is not limited to just one type of camera.

SUMMARY OF THE INVENTION

The general purpose of the present invention is to provide a surveillance camera system which is cost effective, easily maintained, and will accept any suitably sized surveillance camera. The system is particularly advantageous in that the camera assembly can be easily engaged or disengaged from a rotation ring within the cone affixed to the base of the surveillance camera system. The dome is likewise easily engaged and disengaged from spring-biased rollers. The dome includes a bracket so that the viewing portion of the dome rotates with the lens of the camera.

According to one embodiment of the present invention, there is provided a surveillance camera system including a base, a truncated cone, and rotation ring affixed to the inner base of the truncated cone. A camera assembly engages the rotation ring with a spring-biased drive wheel of a first drive motor. A second drive motor rotates the camera with respect to the horizon. A base plate on a camera mounting assembly is included for the mounting of any suitable security camera. A polymer dome is engaged against spring-biased rollers for ready access to the camera assembly. The surveillance camera system is intended to be readily installed and removed.

Another embodiment of the present invention illustrates a surveillance camera system including a truncated dome, a surveillance dome, and a camera mounting assembly suspended from a support in which the entire system rotates about the support.

Significant aspects and features include a surveillance camera system which is easily installed into an existing structure or new structure.

Another significant aspect and feature is a camera assembly which engages within the surveillance camera system which can be easily engaged or disengaged. The surveillance camera system can even be a deterrent even though a camera assembly may not be installed because of its mere presence and security appearance.

Having thus described the embodiments of the present invention, it is the principal object hereof to provide a surveillance camera system, such as for closed-circuit television cameras.

One object of the present invention is to provide a surveillance camera system which is cost effective.

Another object of the present invention is to provide a surveillance camera system which is easy to install and easy to maintain.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
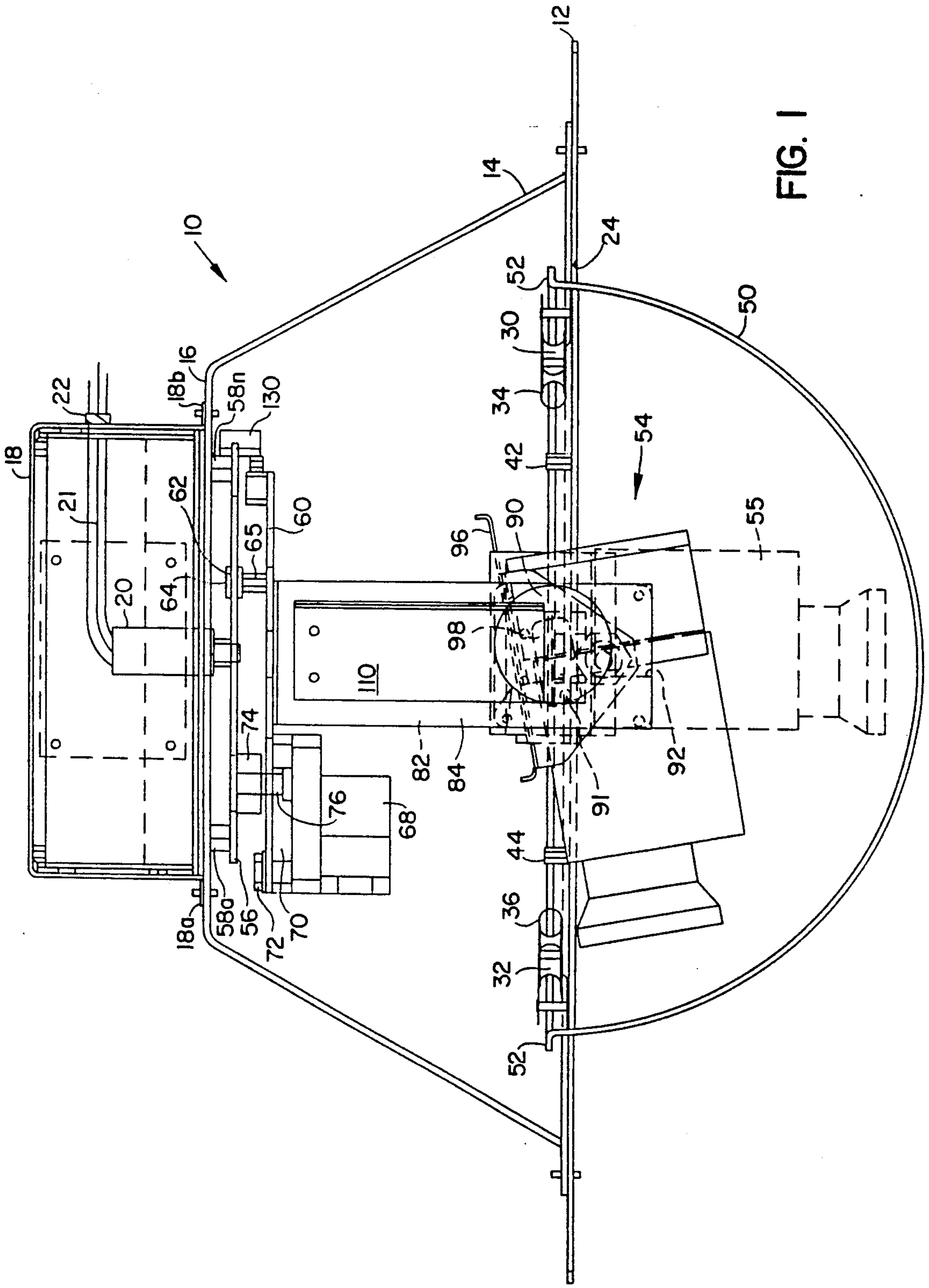
FIG. 1 illustrates a cross-sectional side view of a surveillance camera.
Figure 2:
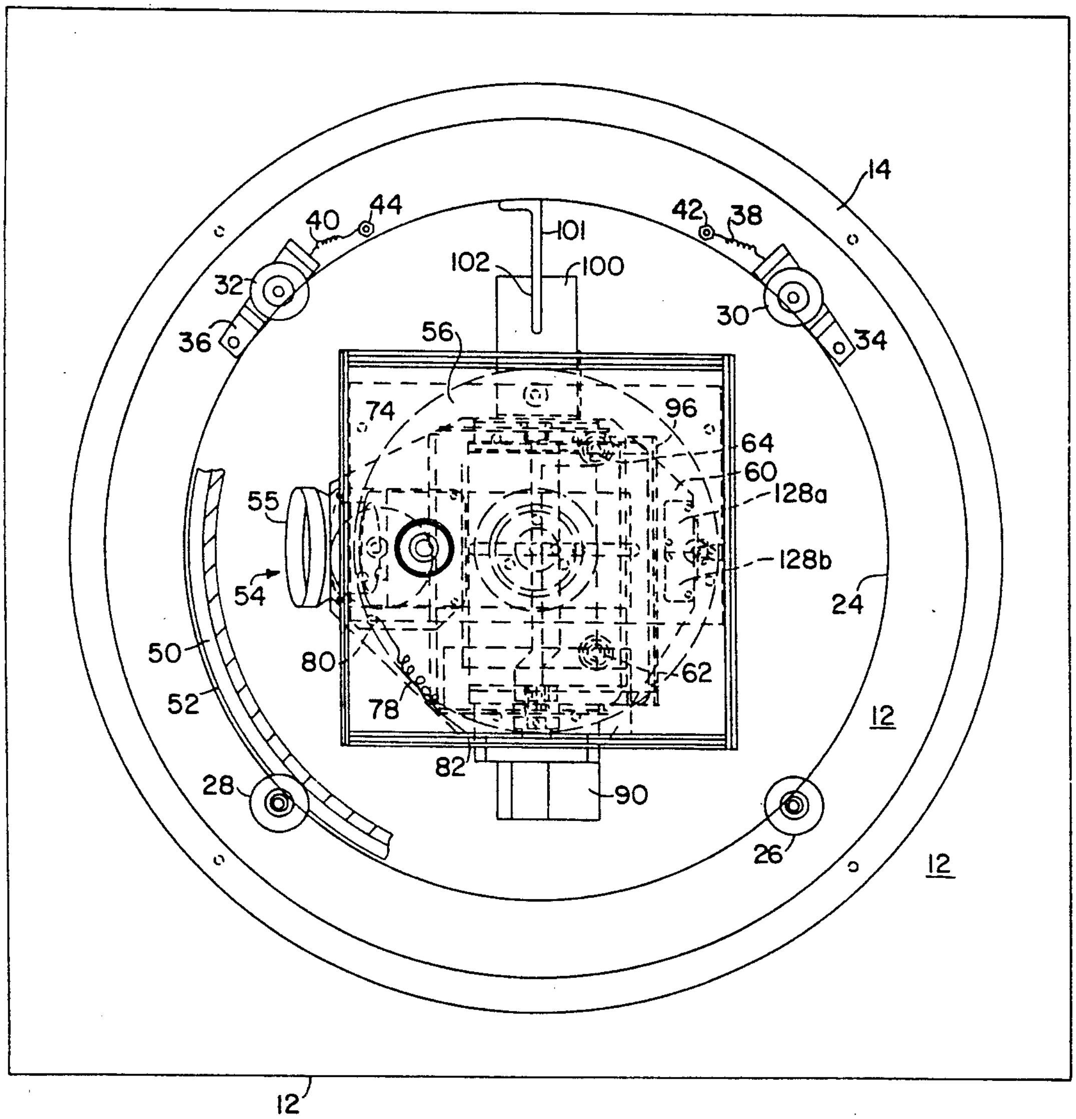
FIG. 2 illustrates a bottom view in partial cross section.

FIG. 1 illustrates a cross-sectional side view of a surveillance camera system 10, the present invention, including a base 12. The size of base 12 is such as to be mounted in the space of a ceiling tile. A truncated cone 14 affixes to the base 12, such as with a plurality of bolts, washers and nuts. A U-shaped bracket 18 affixes to the cone top 16 of the truncated cone 14 with a U-shaped bracket with right angle flanges **18*a*–18*b*. A slip-ring assembly 20, such as that manufactured by Litton Industries, extends through an approximate center of the truncated cone 14 for the passage of the slip-ring assembly 20, including a plurality of electrical communication wires 21, as later described in detail. A wire nut 22 secures the wires for the slip-ring assembly 20 in place. The base 12 includes a large diameter hole 24. Fixed rollers 26 and 28 are suspended on bolt, washer and nut arrangements as illustrated in FIG. 2. Many of the following members are also illustrated with reference to FIGS. 2 and 3. Spring-biased rollers 30 and 32 are positioned in modified pivoting U-shaped brackets 34 and 36, respectively, and are secured within the modified pivotal U-shaped brackets 34 and 36 with bolt, washer and nut arrangements. The modified pivotal U-shaped brackets 34 and 36 are pivotally secured to the base 12 with bolt spacer, washer and nut arrangements. Springs 38 and 40 connect between the modified pivotal U-shaped brackets 34 and 36 and stud assemblies 42 and 44**, which are secured to the base. A surveillance dome 50, including a lip 52, is engaged against the springbiased rollers 30 and 32 and positioned into the grooves of the fixed rollers 26 and 28 for subsequent rotation with the camera mounting assembly 54, as later described in detail.

A rotation ring 56 is mounted by a plurality of spacers 58*a*–58*n* from the bottom of the truncated cone 14 for support of a camera mounting assembly 54 as later described in detail.

Figure 6:
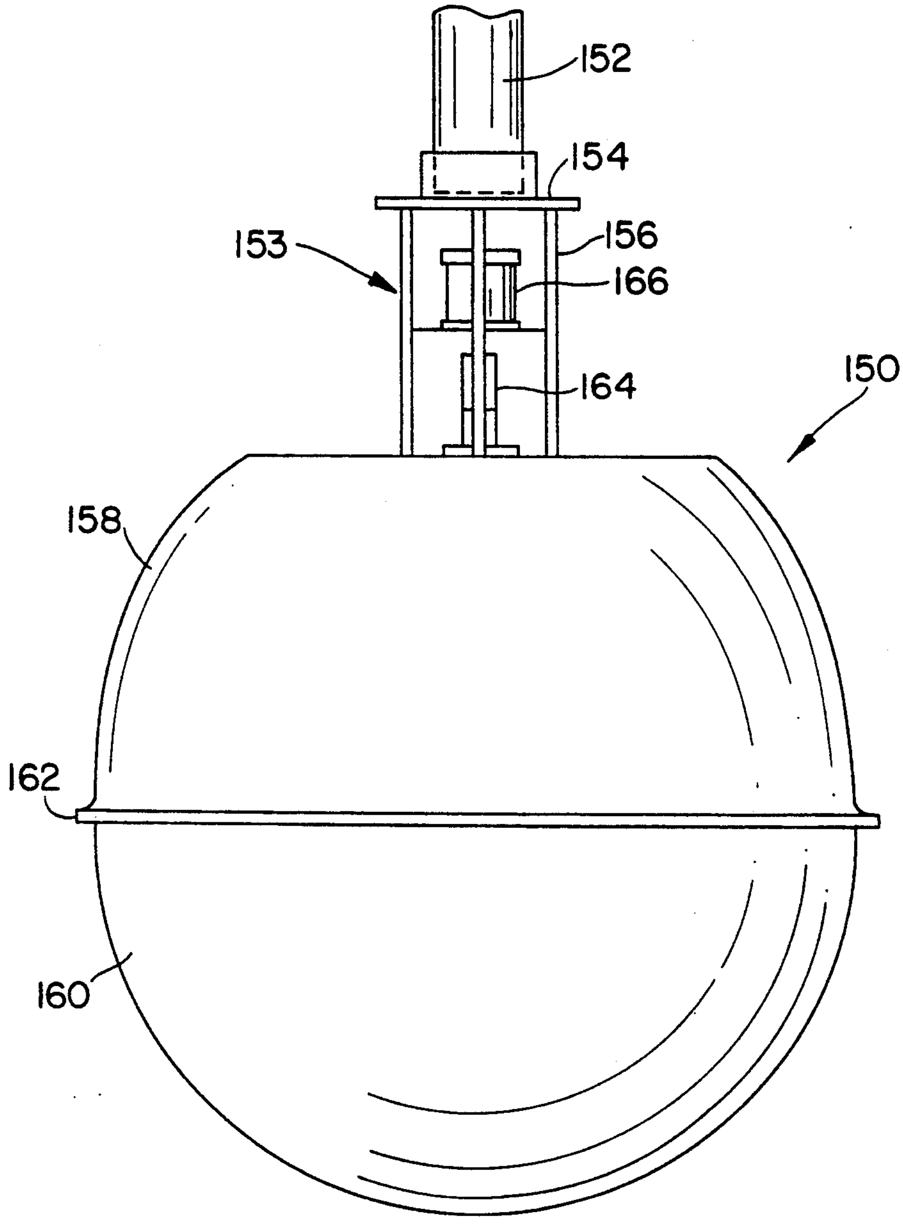
FIG. 6, an alternative embodiment, illustrates a side view of a suspendable surveillance camera system; and, FIG. 7 illustrates a cross-sectional view of FIG. 6.

The camera mounting assembly 54 includes a mounting plate 60. Two grooved idler wheel assemblies 62 and 64 are mounted on spacers 63 and 65, respectively, extending from the mounting plate 60. A motor 68 mounts on a motor plate 70. A pivot bolt and washer assembly 72 rotatably secures the motor plate 70 to the mounting plate 60. A drive wheel assembly 74, including a concentric rubber drive secures to the drive shaft 76 of the motor 68. A spring 78 connects from a stud 80 on the motor plate 70 to a bracket 82 affixed to the mounting plate 60 as later described in detail. The rotation ring 56 engages the grooved idler wheels 62 and 64. The drive wheel assembly 74, which is pivotally mounted via the motor plate 70, engages the rotation ring 56 also by the force of the spring 78. This three point suspension of the rotation ring 56 is accomplished so that the rotation ring 56 and any components secured thereto may be driven azimuthally by action of the motor 68. A right upright bracket 82 and a left upright bracket 84 secure to and extend downwardly from the mounting plate 60 as now described in detail. An elevational tilt motor 90 bolts to the right upright bracket 82 which includes an elongated slot 9 for accommodation of the drive shaft 93 and overlying lug 95 of the elevational tilt motor 90, as illustrated in FIG. 6. A rotatable pivot bearing 94 opposes the motor drive shaft 93 on the left upright bracket 84, and is secured thereto by a shouldered bolt 88 and a nut 89. A stud 91 bolts to the left upright bracket 84 and is spaced from the pivot bearing assembly 94. A U-shaped camera mounting plate 96 includes downwardly extending arms 96*a* and 96*b*. The camera mounting plate 96 is suspended between the motor drive shaft lug 95 and the pivot bearing 94. The motor 90 drives the camera mounting plate 96 and an attached camera 55. A rectangular hole 98 in the downwardly extending arm 96*a* of the camera bracket 96 rides about the stud 91 to limit elevational movement of the camera mounting plate 96. An elongated hole 99 is located in the camera bracket for mounting of a camera. A bubble drive bracket 100 extends at a right angle outwardly from the left bracket 84, and includes a slot 102 to accept a bracket 101 secured to the dome 50 so that the dome 50 rotates with the camera mounting assembly 54. The dome 50 includes a clear viewing area 103, while the rest of the dome is of a opaque color for optical considerations.

FIG. 2 illustrates a bottom view in partial cross section where all numerals correspond to those elements previously described. Reference is noted to the fixed rollers 26 and 28 and the spring-biased rollers 30 and 32. The lip 52 of the dome 50 is engaged against the spring-biased rollers 30 and 32 and then engaged into position with the fixed rollers 26 and 28. Also illustrates is the bracket 101 engaging slot 102 of the bubble drive bracket 100 to cause the dome 50 to follow azimuth rotation of the rotation ring 56 and the attached camera 55.

Figure 3:
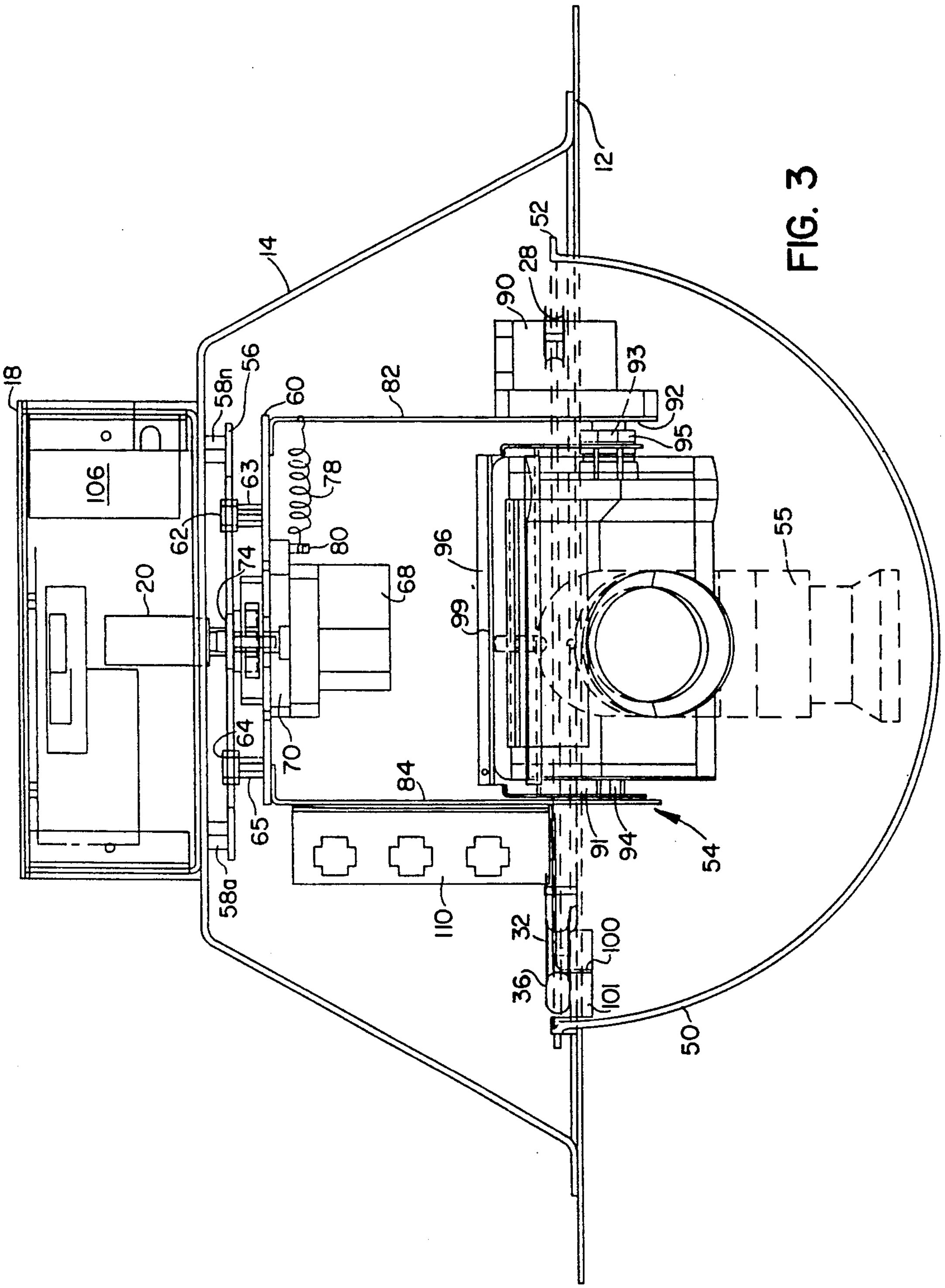
FIG. 3 illustrates a cross-sectional front view.

FIG. 3 illustrates a front view in partial cross section of the surveillance camera system 10 where the camera 55 is indicated between a horizontal and a vertical position. Wires from the slip ring assembly 20 and the camera 55 connect to the terminal block area 106 and are not profusely illustrated for the sake of brevity in the drawings.

Figure 4:
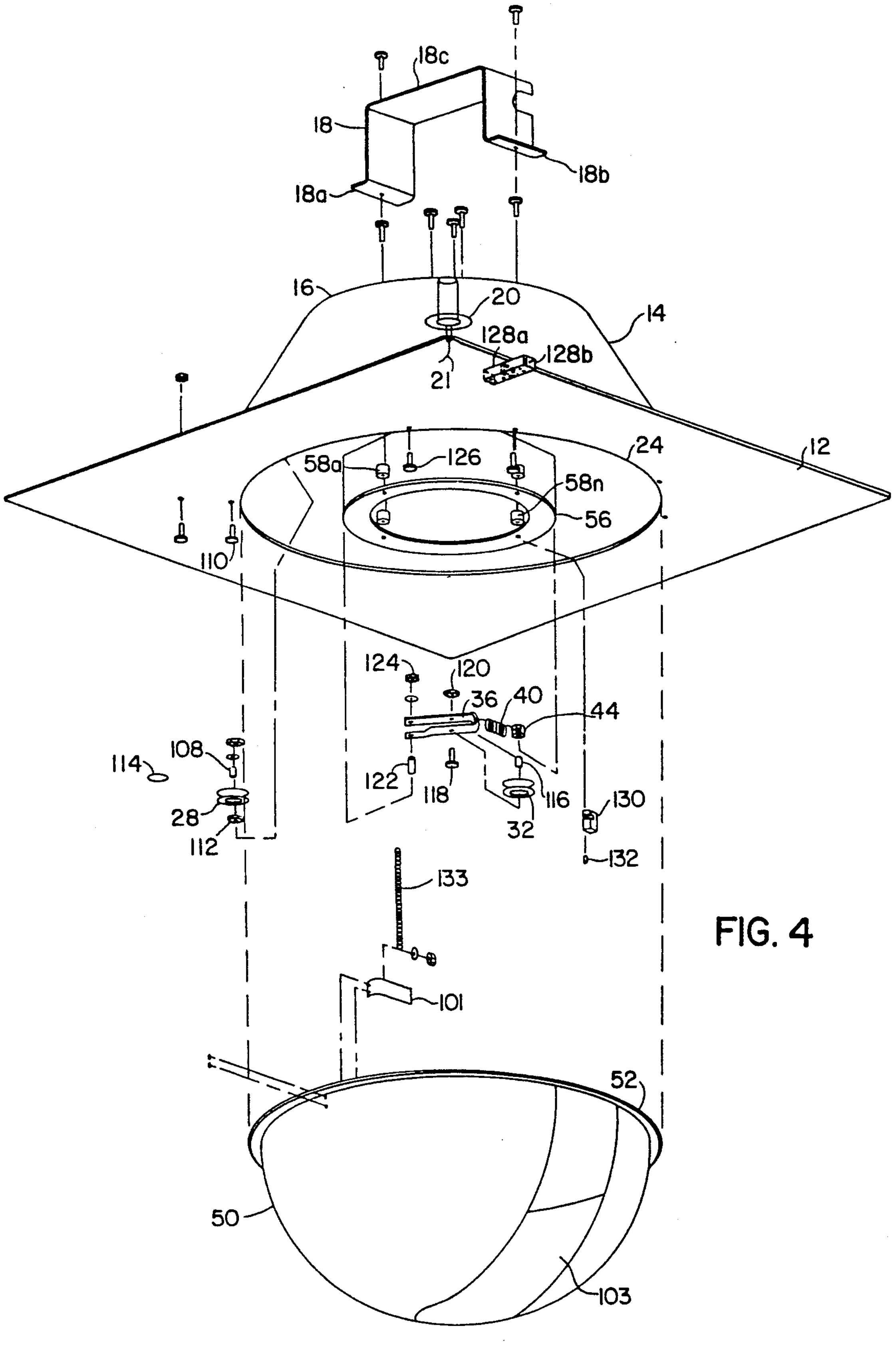
FIG. 4 illustrates an exploded view of the surveillance camera mounting system with the camera assembly removed.

FIG. 4 illustrates an exploded view of the surveillance camera system 10 with the camera assembly 55 removed for brevity and clarity of illustration. All numerals correspond to those numbers previously described. An exploded view of the camera mounting assembly 54 is provided in FIG. 5. Illustrated is the fixed roller 28 and its associated component members. The fixed roller 28 aligns over an axle post 108, a screw 110, and mounts over a spacer 112 and is secured appropriately by a nut and washer which is not numbered for purposes of brevity. An O'ring 114 fits over the groove of the fixed roller 28.

The spring bias roller 32 mounts over an axle post 116 and secures to the U-shaped bracket 36 with a nut and bolt 118 and 120. A pivot post 122 aligns with opposing holes in the end of the U-shaped bracket 36. The bracket 36 and pivot post 122 secure to the base 12 with a nut and bolt 124 and 126. Spring 40 attaches to the U-shaped end of the bracket 36 and to the base 12 mounted stud assembly 44 to provide pressure loading of the spring bias roller 32 against the lip 52 of the dome 50. Limit switches 128*a* and 128*b* are located under the truncated cone 14 to provide for rotational limits of the camera mounting assembly 54. A limit switch cam 130 secures to the rotation ring 56 and is secured by a set screw 132. The limit switch cam 130 interacts with the limit switches 128*a* and 128*b*. A safety chain 133 attaches to the bracket 111 and to an appropriate structure point to keep the dome 50 loosely attached to the main structure for servicing or adjustment of the unit.

Figure 5:
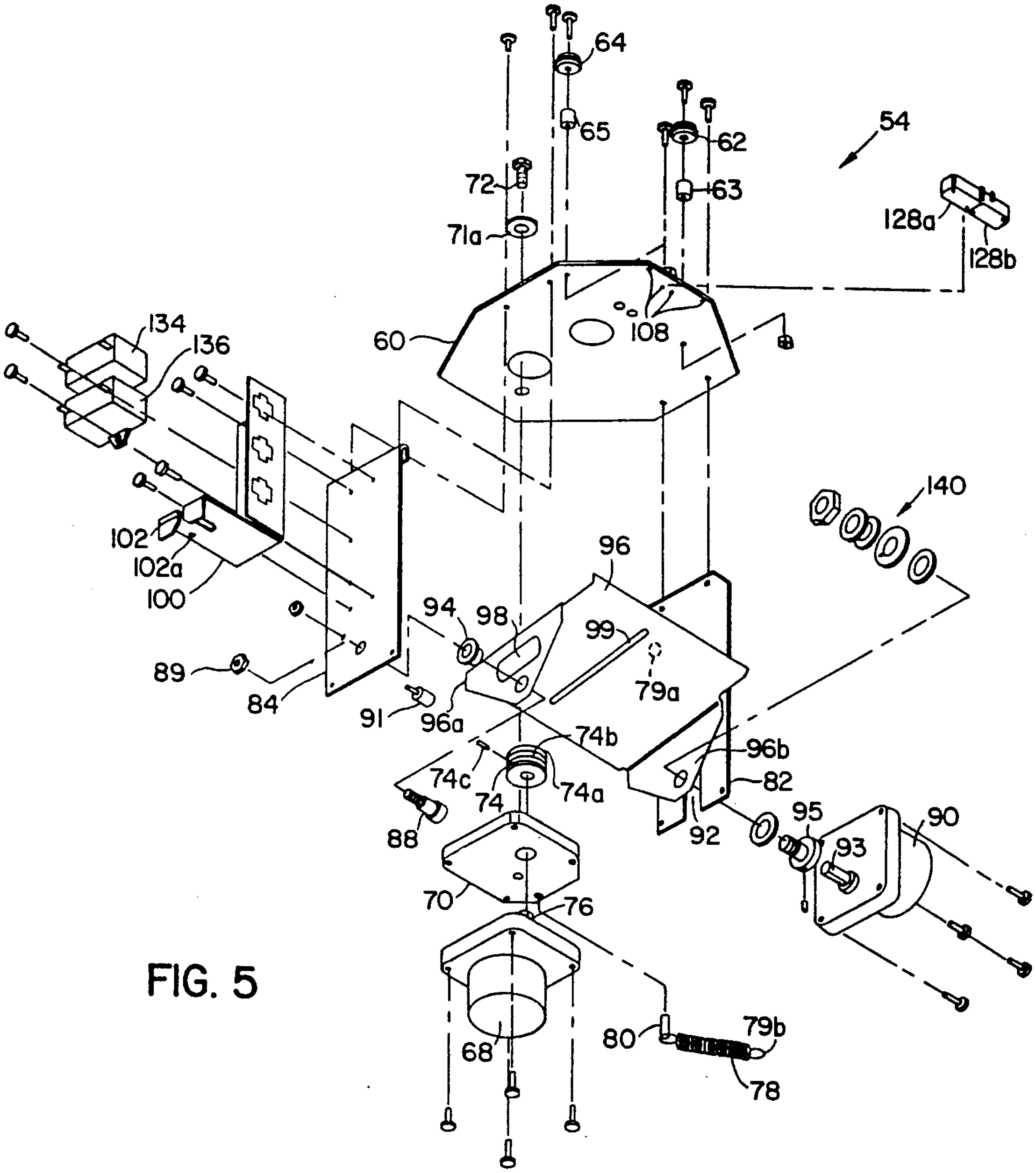
FIG. 5 illustrates an exploded view of the camera mounting assembly.

FIG. 5 illustrates an exploded view of the camera mounting assembly 54 where all numerals correspond to those elements previously described. Motor capacitors 134 and 136 secure to the bubble drive bracket 100. Also illustrated are a nut and washer assembly 140 which secures the downwardly extending leg 96*b* of the camera mounting of the camera mounting plate 96 to the lug 95 of the motor 90.

Figure 7:
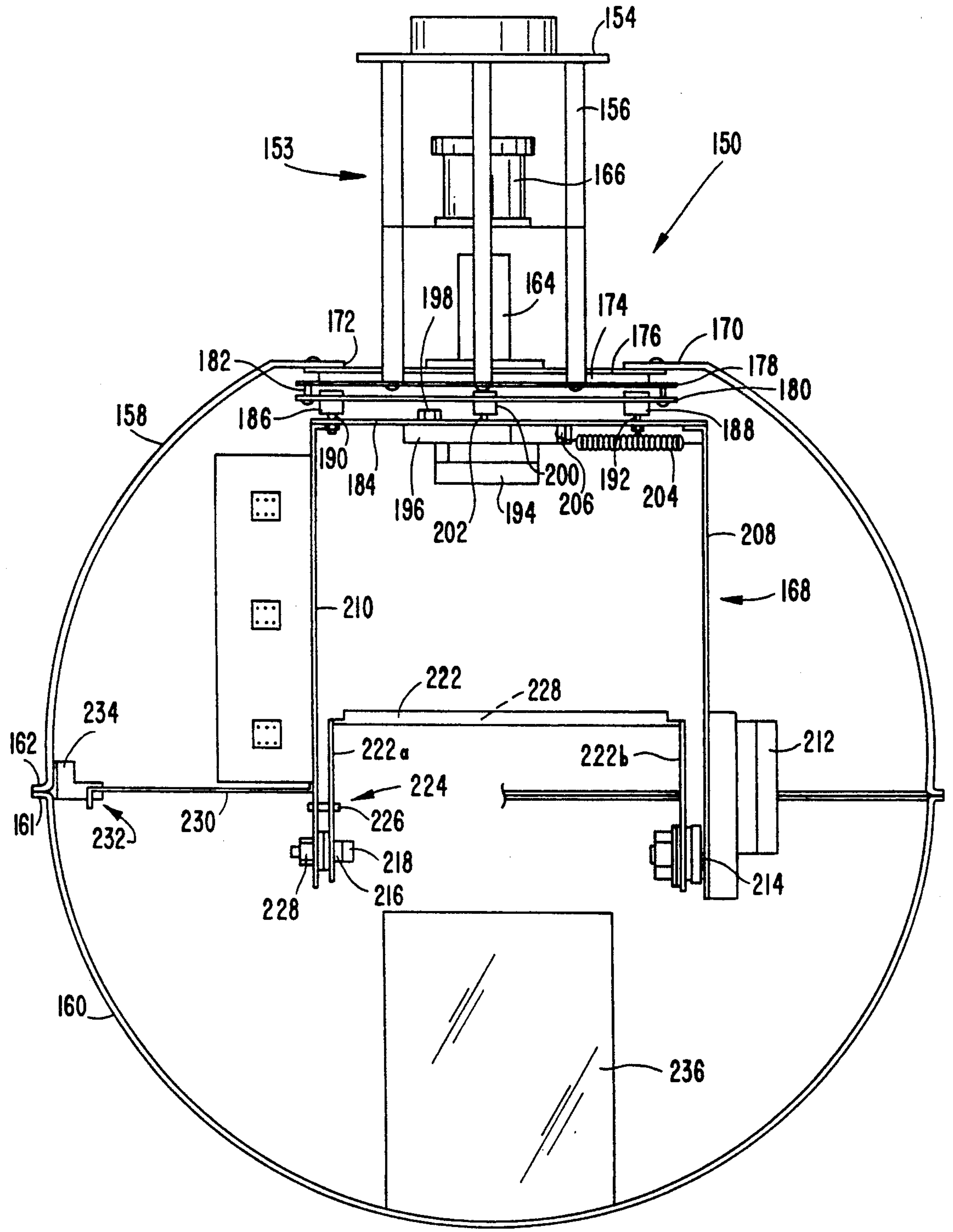

FIG. 6, an alternative embodiment, illustrates a front view of a surveillance camera system 150 which suspends from an external support 152, such as a pipe or other suitable means. The major visible components in this illustration are a support 153, including flange 154, a plurality of support rods 156 extending downwardly from the flange 154, a truncated dome 158 rotatably secured to the bottom of the support rods 156, a truncated surveillance dome 160 similar to dome 50, and a lip 162 about the bottom edge of the truncated dome 158. A lip 161 on the top edge of the surveillance dome 160 engages the lip 162 of the truncated dome 158 as illustrated in FIG. 7. A slip ring assembly 16 and connector assembly 166 align above the truncated dome 158 between the support rods 156. A surveillance dome 160 aligns to the lip 162 as illustrated in FIG. 7. The aligned truncated dome 158, surveillance dome 160 and other internal components as a unit rotate about the central vertical axis of the surveillance camera system 150.

FIG. 7 illustrates a view in cross section of the surveillance camera system 150 where all numerals correspond to those elements previously described. A camera mounting assembly 168 is somewhat similar to the camera mounting assembly 54 described previously in that it incorporates similar components and moves about the same azimuthal and elevational axis.

The truncated dome 158 includes a planar area 170 with a circular hole 172 centered therein. A bearing assembly 174 includes an upper flange 176 and a lower flange 178. The upper flange 176 secures appropriately to the underside of the planar area 170. A rotation ring 180 secures appropriately and at a finite distance to the lower flange 178 of the bearing assembly 174 with a plurality of spacers 182 for support of the camera mounting assembly 168.

The camera mounting assembly 168 includes a mounting plate 184. Two grooved idler wheel assemblies 186 and 188 are mounted on spacers 190 and 192, respectively, extending from the mounting plate 184. A motor 194 mounts on a motor plate 196. A pivot bolt and washer assembly 198 rotatably secures the motor plate 196 to the mounting plate 184. A drive wheel assembly 200, including a concentric rubber drive secures to the drive shaft 202 of the motor 194. A spring 204 connects from a stud 206 on the motor plate 196 to a bracket 208 affixed to the mounting plate 184. The inner circumference of the rotation ring 180 engages the grooved idler wheels 186 and 188. The drive wheel assembly 200, which is pivotally mounted via the motor plate 196, engages the inner circumference of the rotation ring 180 also by the force of the spring 204. This three point suspension of the rotation ring 180 and any components secured thereto may be driven azimuthally by action of the motor 194. A right upright bracket 208 and a left upright bracket 210 secure to and extend downwardly from the mounting plate 184 as now described in detail. An elevational tilt motor 212 bolts to the right upright bracket 208 which includes an elongated slot (not illustrated) for accommodation of the drive shaft 214 and overlying lug of the elevational tilt motor 212 in a fashion, as illustrated in FIG. 5. A rotatable pivot bearing 216 opposes the motor drive shaft 214 on the left upright bracket 210, and is secured thereto by a shouldered bolt 218 and a nut 220. A U-shaped camera mounting plate 222 includes downwardly extending arms **222*a* and 222*b* which pivot about the rotatable pivot bearing 216 and with the drive shaft 214 of the elevational tilt motor 212. The camera mounting plate 222 is suspended between the motor drive shaft lug 214 and the rotatable pivot bearing 216. The elevational tilt motor 212 drives the camera mounting plate 222 and an attached camera (not illustrated) which normally secure to camera mounting plate 222. A rectangular hole 224 in the downwardly extending arm 222*a* of the camera bracket 222 rides about a stud 226 to limit elevational movement of the camera mounting plate 222. An elongated hole 228 is located in the camera bracket for mounting of a camera. A bubble drive bracket 230 extends at a right angle outwardly from the left bracket 210, and includes a slot 232 to accept a bracket 234 secured to the truncated dome 158 so that the truncated dome 158 rotates with the camera mounting assembly 168. The motor 194 causes the camera mounting assembly 168, an attached camera, the truncated dome 158 and the attached dome 160 to revolve as a unit about the bearing assembly 174. The truncated dome 158 includes a clear viewing area 236**, while the rest of the dome is of an opaque color for optical considerations.

MODE OF OPERATION

The camera mounting assembly 54 is engaged into the rotation ring 56 by movement of the spring-biased motor 68 so that the idler wheels are first positioned and engaged within the inner circumference of the rotation ring 56. Then, the drive wheel 74 is positioned and engaged within the inner circumference of the rotation ring 56. Next, the dome is engaged against the spring-biased rollers 30 and 32 and pushed in to engage with the fixed rollers 26 and 28, while at the same time, aligning the dome drive bracket 101 into the slot 102 of the drive bracket 100 affixed to the bracket 84 on the camera mounting assembly 54. The camera mounting assembly 54 can be secured by the chain 133 to the truncated dome 14 in the event that the camera were to disengage. The base 12 of the surveillance camera can be inserted into a ceiling, such as in the place of a ceiling tile or any other enclosure in the ceiling or the wall.

The suspended surveillance camera system of FIGS. 6 and 7 operate in a much similar manner with the exception that the entire assembly turns as a unit and does not require flush mounting, such as in a ceiling panel.

The surveillance camera is wired to the appropriate monitor, and the motor controls are wired to an appropriate control box, such as a joy stick, for controlling movement of the camera mounting assembly 54.

Various modifications can be made to the present invention without departing from the apparent scope hereof.

We claim:

1. Surveillance camera system comprising:

a. a support;

b. a truncated dome rotatably affixed to said support;

c. a bearing means attached to said support;

d. a truncated dome attached to an upper flange means of said bearing means;

e. a rotation ring attached to and spaced from a lower flange means of said bearing means;

f. a camera assembly means including means for rotating said camera assembly means within said rotation ring;

g. means for rotating said camera assembly between a horizontal access to a vertical access;

h. fixed roller means and spring-biased roller means affixing said camera assembly to said rotation ring; and, i. means for rotational following of a surveillance dome with said truncated dome.

2. Surveillance camera system of claim 1 which mounts on a standard.

* * * * *